United States Patent [19]
Thornsbury

[11] 3,871,053
[45] Mar. 18, 1975

[54] EQUALIZER BEAM BUSHING PRESS
[76] Inventor: Ed Thornsbury, 3308 S.W. 59th Terrace, Fort Lauderdale, Fla. 33314
[22] Filed: June 18, 1973
[21] Appl. No.: 371,037

[52] U.S. Cl. ............................................. 29/252
[51] Int. Cl. ............................................ B23p 19/02
[58] Field of Search ............... 29/149.5 R, 252, 282; 254/84, 85, 93 R

[56] References Cited
UNITED STATES PATENTS
3,217,395  11/1965  McBroom et al. .................... 29/252
3,346,944  10/1967  West .................................... 29/252
3,403,434  10/1968  Calabro .............................. 29/252

Primary Examiner—Al Lawrence Smith
Assistant Examiner—Harold P. Smith, Jr.
Attorney, Agent, or Firm—Malin & Haley

[57] ABSTRACT

A machine for inserting and removing tandem axle equalizing beam bushings which allows the bushings to be changed without removal of the equalizing beam or the wheels from the tandem axle vehicle. The machine includes an adjustable equalizer beam, vertical and horizontal support platform, and an axially moveable pressing means for inserting and removing the bushings.

3 Claims, 6 Drawing Figures

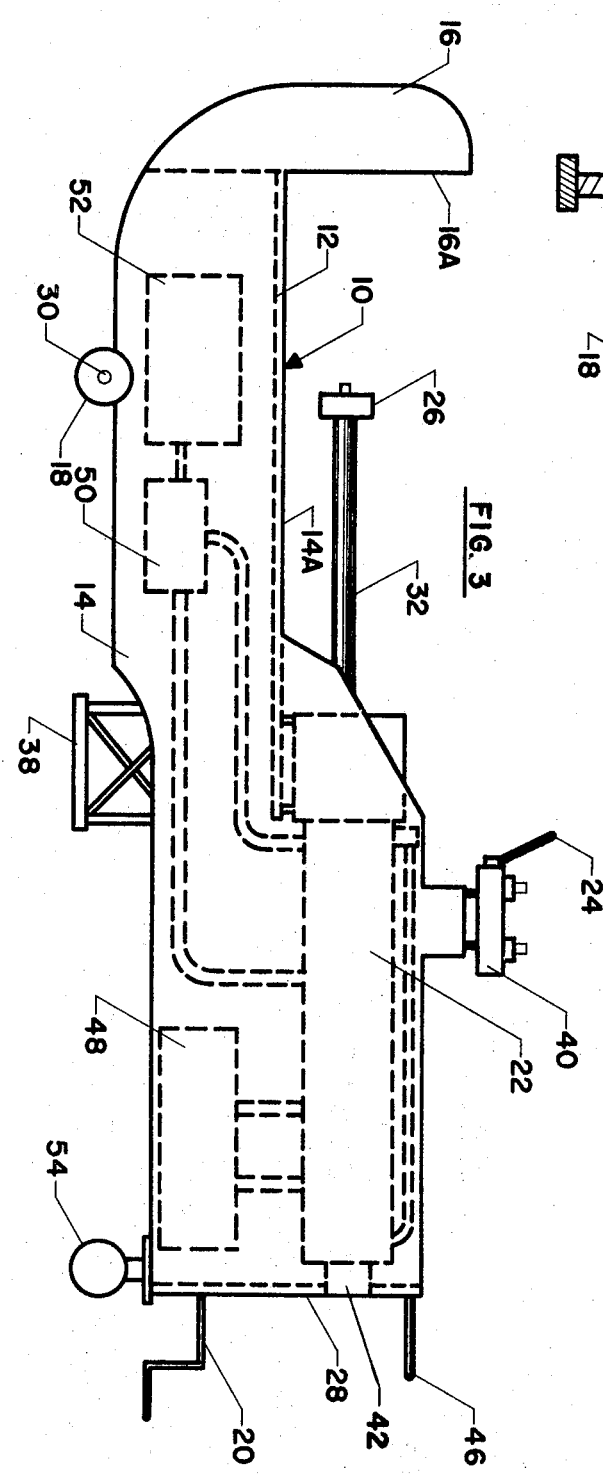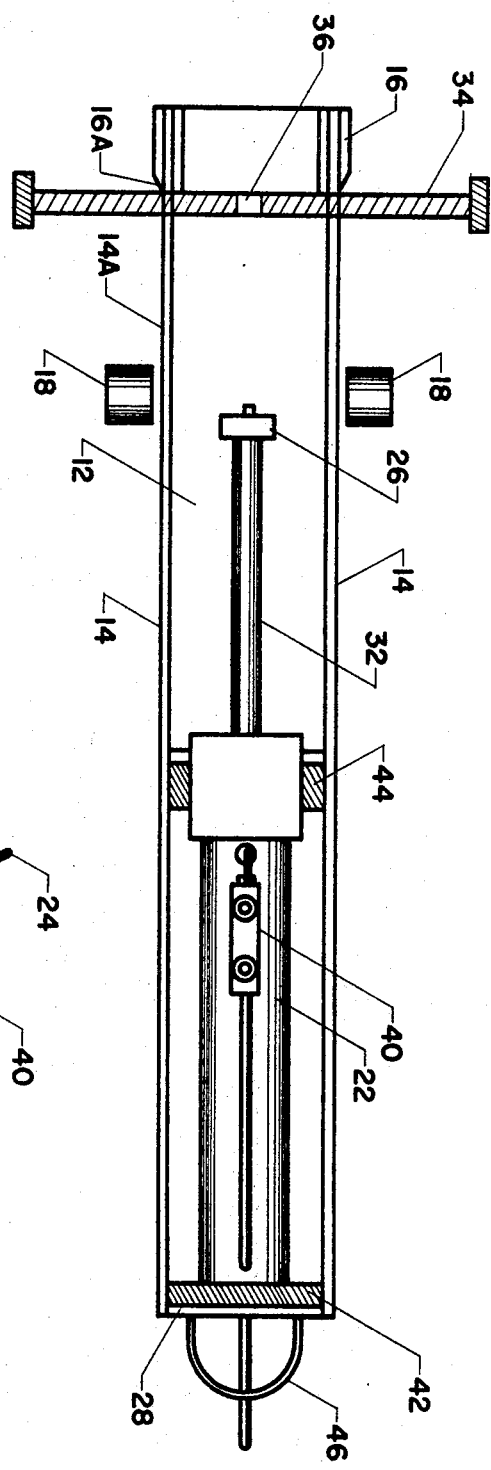

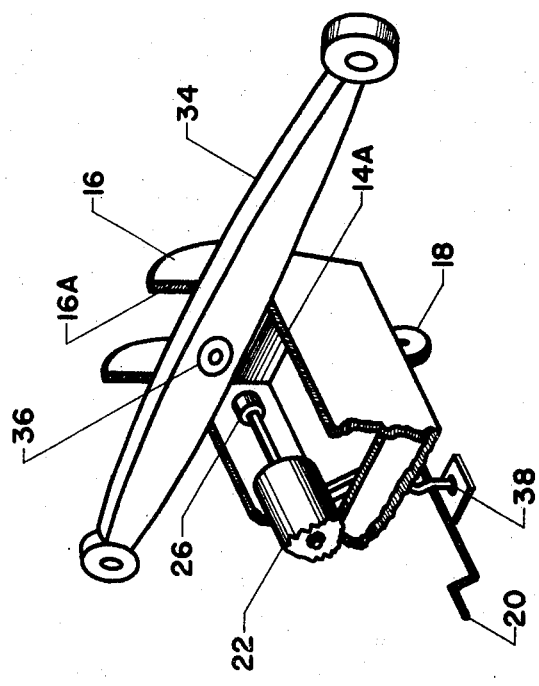

EQUALIZER BEAM BUSHING PRESS

BACKGROUND OF THE INVENTION

This invention relates generally to a machine for inserting and removing bushings for use in axles, or the like, and in particular for a special device for the insertion and removal of center beam bushings used in a tandem axle equalizing beam, found on all tandem axle vehicles, especially heavy trucks and the like.

The center beam bushings found in the tandem axle equalizing beam require periodic replacement due to wear and exposure to the elements. Up to the present, the task has been extremely time consuming and difficult in that the equalizing beam had to be removed from the vehicle in order to remove the bushings from the beam. This not only increased the cost of changing the bushings but reduced the amount of productive load time for the vehicle involved while it was in repair.

Applicant's invention provides a machine which will quickly replace the beam bushings without necessitating removal of the equalizing beam from the vehicle, and in fact, does not require the removal of the tires of the vehicle.

BRIEF DESCRIPTION OF THE INVENTION

A machine for inserting and removing tandem axle equalizing beam bushings comprising a horizontally disposed platform, means coupled to said platform for raising and supporting said platform in a vertical direction, a pressing means for providing axial displacement coupled to said horizontally disposed platform, said platform having a horizontal receiving portion for mounting a tandem axle equalizing beam and a vertical bracing portion adjacent one end of said platform displaced oppositely from said pressing means to provide a stopping means for bracing a tandem axle beam to prevent movement in the displacement direction of said pressing means. The pressing means is an hydraulically actuated piston having a shaft with a bearing or bushing engagement means at the end of the shaft. A plurality of wheels are provided on the base of the horizontal supporting platform which allow for movement of the machine into position adjacent the equalizing beam.

In operation applicant's machine is wheeled underneath the equalizing beam which is coupled to the vehicle. The vertical lifting means is then actuated so that the upper position of the device engages the bottom of the equalizing beam. The vertical supporting portion is then engaged with the inner side of the equalizing beam. The pressing means is then actuated with the bearing or bushing to be removed. The device is then hydraulically actuated and the bushing is pressed from within to without the axle sleeve in the equalizing beam. The pressing shaft is then withdrawn from the axle sleeve and the new bearing to be inserted is coupled to the end of the shaft. The new bearing is then hydraulically pressed into position within the equalizing beam and the operation is complete. The procedure is then repeated for the other bushings in the equalizing beam.

It is an object of this invention to provide a machine for improving the servicing and replacement of tandem axle equalizing beam bushings.

And yet another object of this invention is to provide a machine which improves the efficiency and reduces the time required for the changing of tandem axle equalizing beam bushings.

And still yet another object of this invention is to provide a bushing removal device.

Still yet another object of this invention is to provide a portable machine that may be moved to a desired location which will accomplish the changing of tandem axle equalizing beam bushings in a minimal amount of time, without necessitating the removal of the equalizing beam from the vehicle.

In accordance with these and other objects which will be apparent hereinafter, the instant invention will now be described with particular reference to the accompanying drawings.

BRIEF DESCRIPTION OF THE DRAWINGS

FIG. 2 shows a plan view of applicant's invention with a tandem axle equalizing beam in cross-section.

FIG. 3 shows a side elevational view of applicant's invention, partially dotted, while the invention is in operation.

FIG. 4 shows applicant's invention in perspective cut-away while engaging a tandem axle equalizing beam.

PREFERRED EMBODIMENT OF THE INVENTION

Figure 1:
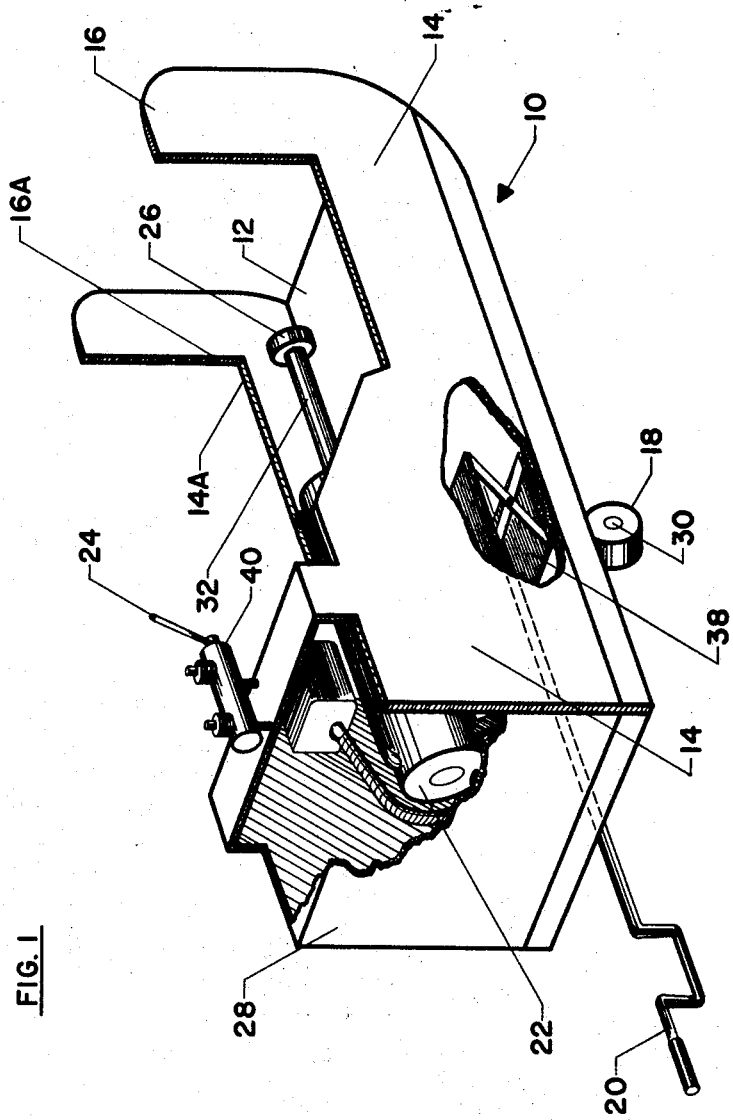
FIG. 1 shows a perspective view of applicant's invention, with a cut-away wall portion.

Referring now to the drawings and in particular FIG. 1, applicant's device, shown generally at 10, is comprised of a supporting platform 12 having a plurality of sides 14, the height being contoured to receive an equalizing beam, the reduced height in the mid-section terminating in the upper surface 14A, and a raised vertical portion 16 having a vertical face 16A facing towards hydraulic cylinder 22 mounted firmly to end plate 28 and platform 12. The entire platform 12 is mounted between vertical parallel walls 14 having a pair of rear wheels 18 to allow the device 10 to be moved wherever desired. The wheels 18 are coupled to the platform 12 in a standard manner by coupling means 30. Also coupled beneath supporting platform 12 is a jacking device 38 coupled substantially under the platform 12. A jacking actuating member 20 is coupled beneath platform 12 and terminates into the jacking device 38. Hydraulic cylinder 22 has a longitudinally moveable shaft 32 with a removeable coupling adapter 26 disposed at the end of the shaft. A hydraulic control handle 24 actuates two-way valve 40 which provides hydraulic fluid under pressure into cylinder 22 to move the shaft and member 26 axially along the cylinder.

The pressing device which is comprised of a hydraulically moved piston within cylinder 22 is conventional and may be either manually or electrically actuated. Hydraulic fluid is provided under pressure to a piston inside of cylinder 22 providing force along shaft 32 axially disposed.

The sides 14 are contoured to receive a tandem axle equalizing beam which is disposed horizontally on edge 14A and vertically along edge 16A, both of which firmly hold the equalizing beam in position while the shaft 32 and bearing engagement device 26 are utilized to press out the bushing to be replaced.

The upper portion of the jack 38 is coupled to the bottom side of support platform 12 which allows one end of the device to be raised to allow engagement of the horizontal edge 14A with the bottom of the equalizing beam, providing support for the vehicle and the equalizing beam. The jacking device is similar in operation to a conventional axle jack in which the bottom of the jack engages the floor which the wheels are supported upon and the top of the device is coupled rigidly to the supporting platform 12.

A hydraulic pump 50 (FIG. 3) driven by electric motor 52 provides hydraulic fluid under pressure to operate the hydraulic piston within cylinder 22. A reservoir tank 48 for storing hydraulic fluid is mounted under cylinder 22. The cylinder 22 is rigidly fixed to the end wall 28 with mounting plate 42 and at its opposite end to plate 44 which is fixed to floor 14. The hydraulic system is closed and by the actuation of two way valve 40 selectively provides hydraulic fluid under pressure to either side of the piston with cylinder 22. The piston is connected to shaft 32.

A swivel wheel 54 is connected at one end to facilitate movement of the device with handle 46.

FIG. 2 shows an equalizing beam 34 positioned against vertical supports 16A and resting on horizontal surfaces 14A. Shaft 32 and the entire pressing device is axially aligned so that the bearing engaging means 26 is received into the beam equalizer aperature 36 which houses the axle bushings.

FIG. 3 shows the device from the side with the jack 26 raised to position an equalizing beam properly along the top and back vertical edge of the device.

FIG. 4 shows the device in position just prior to the bushing engagement means 26 being driven into the beam axle housing.

Figure 5:
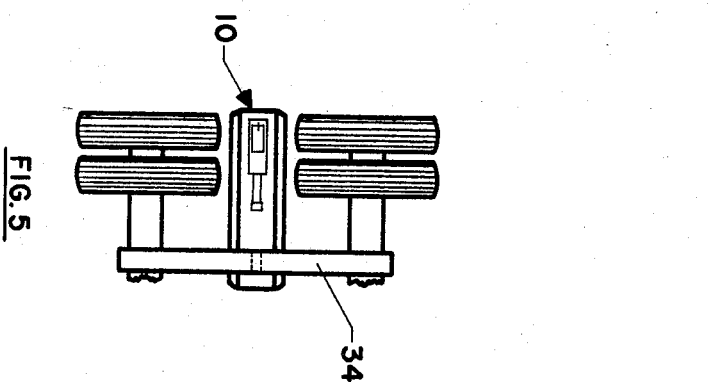
FIG. 5 shows a plan view deployment of applicant's device between the wheels of a truck.

FIG. 5 shows the device installed between the wheels of a tandem axle vehicle and in position adjacent the equalizing beam so that the center bushings may be removed without the removal of the vehicle wheels.

Figure 6:
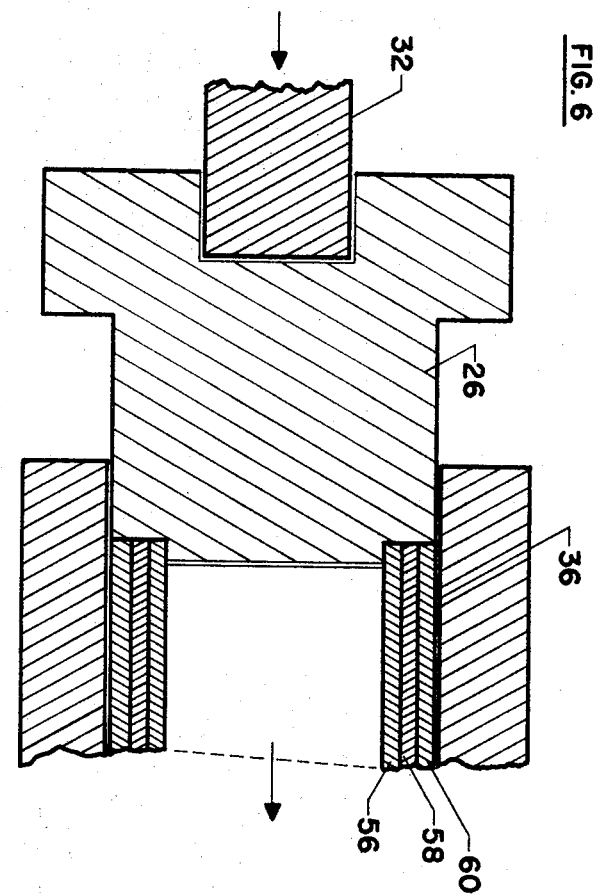
FIG. 6 shows the bushing shaft adapter in elevational cross-section.

FIG. 6 shows the bushing coupling means 26 attached to shaft 32 imbedded in the equalizing beam axle up against a bushing 36. The bushing is forced in the direction of the arrows by movement of the shaft until it is disengaged on the far side of the axle and forced out. A replacement bushing is then placed adjacent the equalizing beam axle opening and cold pressed into position by the axial motion of the shaft and the bushing engaging device.

In operation, the tandem axle vehicle is driven into position and applicant's device is wheeled between the tires adjacent the equalizing beam. The vertical wall portion 16A is placed adjacent the vertical surface of the inside of the equalizing beam. The jacking mechanism is then initiated and the supporting platform is raised so that the bottom of the beam is engaged with the upper horizontal surfaces 14A firmly in place against the bottom of the equalizing beam. The hydraulic press is then actuated and the bushing engaging device cold presses the old bushing out of the equalizing beam axle. The shaft is then retracted from the axle and a new bearing is positioned over the opening of the axle and the pressing device once again engages the replacement bushing and forces it into position.

FIG. 6 shows a standard beam bushing having an outer metal cylinder 60 and an inner metal cylinder 56 with a hard rubber cylinder 58 disposed between the inner and outer metal cylinders.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A machine for inserting and removing tandem axle equalizing beam bushings comprising:

a horizontally disposed rigid planar platform;

a pair of parallely disposed rigid vertical planar sides, each planar side connected along an opposite edge of said rigid planar platform and rising thereabove, each side having an upper beam supporting edge, each edge having a vertical portion and a horizontal portion adapted to receive a tandem axle beam substantially at the junction of said vertical edge portion and said horizontal edge portion;

a beam bushing pressing means mounted on said horizontal platform;

horizontal platform supporting means;

means connected to said platform and said platform supporting means for raising and lowering said horizontal planar platform.

2. A pressing device, as in claim 1, wherein:

said raising and lowering means includes jacking means coupled to said platform.

3. A pressing device, as in claim 1, wherein:

said pressing means includes a hydraulically actuated piston.

* * * * *